(12) United States Patent
Shih et al.

(10) Patent No.: US 8,537,322 B2
(45) Date of Patent: Sep. 17, 2013

(54) LCD DEVICE, LCD MODULE AND MANUFACTURING METHOD THEREOF

(75) Inventors: Ming-Hung Shih, Shenzhen (CN); Meng Li, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 115 days.

(21) Appl. No.: 13/380,903

(22) PCT Filed: Dec. 2, 2011

(86) PCT No.: PCT/CN2011/083402
§ 371 (c)(1),
(2), (4) Date: Dec. 26, 2011

(87) PCT Pub. No.: WO2013/075360
PCT Pub. Date: May 30, 2013

(65) Prior Publication Data
US 2013/0128169 A1    May 23, 2013

(30) Foreign Application Priority Data
Nov. 23, 2011  (CN) .................. 2011 1 0376672.9

(51) Int. Cl.
*G02F 1/1345* (2006.01)
*G02F 1/1333* (2006.01)
*G02F 1/1339* (2006.01)

(52) U.S. Cl.
USPC .................. 349/149; 349/40; 349/190

(58) Field of Classification Search
USPC .................... 349/149, 40, 190
See application file for complete search history.

(56) References Cited

U.S. PATENT DOCUMENTS

| | | | |
|---|---|---|---|
| 2004/0126915 A1* | 7/2004 | Chae et al. | 438/30 |
| 2011/0234965 A1* | 9/2011 | Kim et al. | 349/151 |

* cited by examiner

*Primary Examiner* — Wen-Ying P Chen
(74) *Attorney, Agent, or Firm* — Cheng-Ju Chiang

(57) ABSTRACT

A liquid crystal display (LCD) module is disclosed, which comprises a thin film transistor (TFT) substrate and a color filter (CF) substrate disposed opposite to each other, and a liquid crystal layer sandwiched between the TFT substrate and the CF substrate. The TFT substrate comprises a plurality of transmission test units and a plurality of wires. The CF substrate comprises a plurality of curing test units insulated from each other, and each of the curing test units is electrically connected to one of the wires via one of the transmission test units. An LCD device and a manufacturing method of an LCD module are further disclosed. The LCD device, the LCD module and the manufacturing method thereof according to the present disclosure can avoid occurrence of arcing in the TFT substrate during the CVD process, thereby improving the product yield and reducing the manufacturing cost.

10 Claims, 2 Drawing Sheets

LCD DEVICE, LCD MODULE AND MANUFACTURING METHOD THEREOF

FIELD OF THE INVENTION

The present disclosure generally relates to the technical field of liquid crystal displaying, and more particularly, to a liquid crystal display (LCD) device, an LCD module and a manufacturing method thereof.

BACKGROUND OF THE INVENTION

LCD devices have been widely used in, for example, mobile phones, personal digital assistants (PDAs), notebook computers, personal computers (PCs) and television (TV) sets because of their low radiation level, light weight, thin profile, small volume and low power consumption.

An LCD device mainly comprises an LCD panel and a backlight module for providing a light source for the LCD panel. The LCD panel comprises a thin film transistor (TFT) substrate and a color filter (CF) substrate that are disposed opposite to each other, and a liquid crystal layer sandwiched between the TFT substrate and the CF substrate.

Common LCD devices suffer from a drawback that they have a narrow view-angle range. That is, the contrast of the LCD devices will decrease significantly when users view the LCD panels thereof in a direction offset from the normal direction of the LCD panels. This drawback becomes particularly prominent as the LCD devices evolve towards large sizes. Accordingly, many technologies for enlarging the view-angle range (i.e., providing a wide view angle) of the LCD devices have been developed.

In a process of manufacturing a wide view-angle LCD device, a curing test block is fabricated on a TFT substrate, the TFT substrate and a CF substrate are assembled together and a liquid crystal material is filled therebetween. Then, an edge portion of the CF substrate corresponding to the curing test block is removed to expose the curing test block fabricated on the TFT substrate, and a voltage signal is inputted to the curing test block for testing purpose.

However, the aforesaid manufacturing process has a significant shortcoming that: because the effective display region of the LCD device is required to be as large as possible, a spacing between the curing test block fabricated on the TFT substrate and the edge of the TFT substrate is restricted to a small range. Consequently, arcing tends to occur in the TFT substrate during the chemical vapor deposition (CVD) process, which degrades the product yield of the manufacturing process.

SUMMARY OF THE INVENTION

The primary objective of the present disclosure is to avoid occurrence of arcing in the TFT substrate during the CVD process.

To achieve the aforesaid objective, the present disclosure provides a liquid crystal display (LCD) module, which comprises a thin film transistor (TFT) substrate and a color filter (CF) substrate disposed opposite to each other, and a liquid crystal layer sandwiched between the TFT substrate and the CF substrate. The TFT substrate comprises a plurality of transmission test units and a plurality of wires, and the CF substrate comprises a plurality of curing test units insulated from each other. Each of the curing test units is electrically connected to one of the wires via one of the transmission test units, and the plurality of curing test units are located at a same side of the CF substrate.

According to a preferred embodiment of the present disclosure, the CF substrate comprises a curing test component which comprises the plurality of curing test units; the TFT substrate comprises a transmission test component which comprises the plurality of transmission test units; and the curing test component and the transmission test component are located at an edge of the CF substrate and an edge of the TFT substrate that are away from each other respectively.

To achieve the aforesaid objective, the present disclosure further provides an LCD module, which comprises a TFT substrate and a CF substrate disposed opposite to each other, and a liquid crystal layer sandwiched between the TFT substrate and the CF substrate. The TFT substrate comprises a plurality of wires, and the CF substrate comprises a plurality of curing test units insulated from each other. Each of the curing test units is electrically connected to one of the wires.

According to a preferred embodiment of the present disclosure, the plurality of curing test units are located at a same side of the CF substrate.

According to a preferred embodiment of the present disclosure, the CF substrate comprises a curing test component which comprises the plurality of curing test units.

According to a preferred embodiment of the present disclosure, one of the wires comprises a first common electrode, another of the wires comprises a second common electrode, and the others of the wires are routing lines.

According to a preferred embodiment of the present disclosure, the CF substrate comprises a transparent conductive layer, and the plurality of curing test units are formed by cutting the transparent conductive layer.

To achieve the aforesaid objective, the present disclosure further provides an LCD device, which comprises a backlight module and an LCD panel. The LCD panel comprises a TFT substrate and a CF substrate disposed opposite to each other, and a liquid crystal layer sandwiched between the TFT substrate and the CF substrate. The TFT substrate comprises a plurality of wires, and the CF substrate comprises a plurality of curing test units insulated from each other. Each of the curing test units is electrically connected to one of the wires.

To achieve the aforesaid objective, the present disclosure further provides a manufacturing method of an LCD module, which comprises: fabricating a plurality of wires on a surface of a TFT substrate, and fabricating a plurality of curing test units on a surface of the CF substrate; assembling the TFT substrate and the CF substrate together and electrically connecting each of the curing test units with one of the wires; and removing portions of the TFT substrate that correspond to the curing test units to expose the curing test units on the CF substrate.

According to a preferred embodiment of the present disclosure, a voltage signal is inputted to the curing test units for testing purpose after the portions of the TFT substrate that correspond to the curing test units are removed.

The present disclosure has the following benefits: as compared with the prior art, the LCD device, the LCD module and the manufacturing method thereof according to the present disclosure have the curing test units disposed on a surface of the CF substrate opposite to the TFT substrate. This can avoid occurrence of arcing in the TFT substrate during the CVD process. As a result, the product yield is improved.

BRIEF DESCRIPTION OF THE DRAWINGS

In order to more clearly describe the technical solutions of the embodiments of the present disclosure, attached drawings to be used in the detailed description of the disclosure will be briefly described hereinbelow. Obviously, the attached drawings described hereinbelow only illustrate some of the embodiments of the present disclosure, and those of ordinary skill in the art can also obtain other attached drawings therefrom without the need of making inventive efforts, wherein.

DETAILED DESCRIPTION OF THE INVENTION

Figure 1:
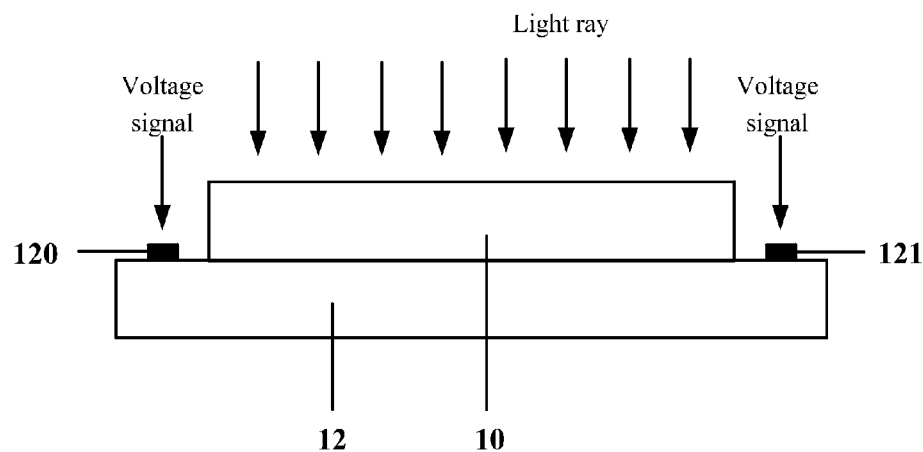
FIG. 1 is a schematic side view illustrating a structure of an LCD module according to a preferred embodiment of the present disclosure.

Various embodiments of the disclosure are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

Hereinbelow, the technical solutions of embodiments of the present disclosure will be described clearly and completely with reference to the attached drawings. Obviously, the embodiments described herein are only some of the embodiments of the present disclosure but do not represent all embodiments of the disclosure. All other embodiments that can be devised by those of ordinary skill in the art on the basis of the embodiments described herein and without making inventive efforts shall fall within the scope of the present disclosure.

Figure 2:
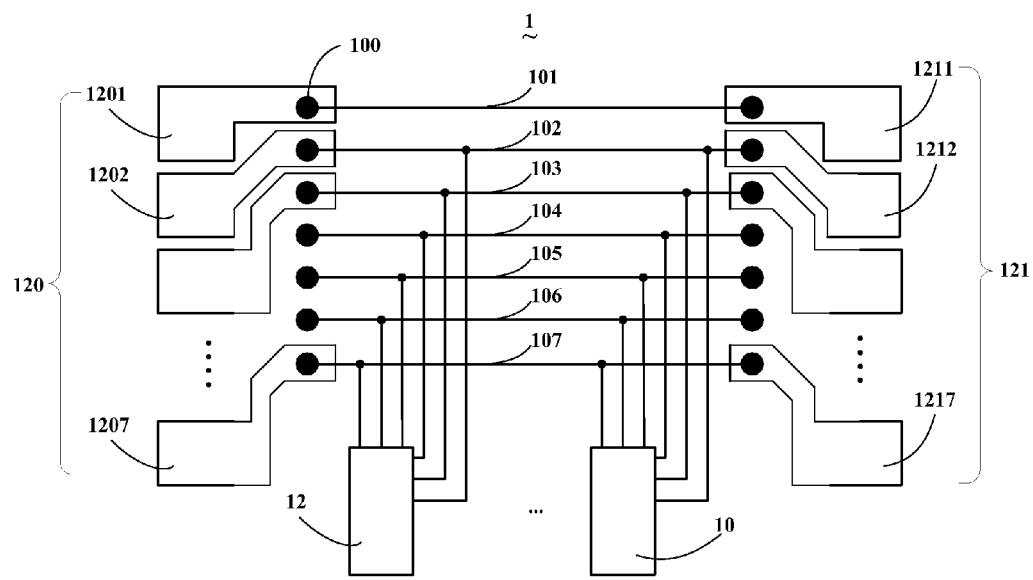
FIG. 2 is a schematic structural view of routing lines of the LCD module shown in FIG. 1.

A liquid crystal display (LCD) module is disclosed in the present disclosure. Referring to FIG. 1 and FIG. 2, FIG. 1 is a schematic side view illustrating a structure of an LCD module according to a preferred embodiment of the present disclosure; and FIG. 2 is a schematic structural view of routing lines of the LCD module shown in FIG. 1.

The LCD module 1 comprises: a thin film transistor (TFT) substrate 10 and a color filter (CF) substrate 12 disposed opposite to each other, and a liquid crystal layer (not shown) sandwiched between the TFT substrate 10 and the CF substrate 12.

The CF substrate 12 comprises a curing test component 120, and the TFT substrate 10 comprises a transmission test component 121 and a plurality of wires 101, 102, 103, 104, 105, 106 and 107.

The curing test component 120 comprises a plurality of curing test units 1201 to 1207 insulated from each other, and the transmission test component 121 comprises a plurality of transmission test units 1211 to 1217 insulated from each other.

The plurality of curing test units 1201 to 1207 are located at a same side of the CF substrate 12. Furthermore, the curing test component 120 and the transmission test component 121 are located at an edge of the CF substrate 12 and an edge of the TFT substrate 10 that are away from each other respectively.

Each of the curing test units is electrically connected to one of the wires. Specifically, each of the curing test units is connected to one of the wires via one of the transmission test units. It shall be particularly noted that, seven wires and the corresponding number of curing test units and transmission test units are illustrated as an example in this embodiment; however, the present disclosure has no limitation on the number of each kind of elements (i.e., the number of the wires, the number of the curing test units and the number of the transmission test units may be different from what described herein).

The wires 101 to 107 include a wire 101 having a first common electrode, a wire 107 having a second common electrode, odd gate lines 105, even gate lines 106 and RGB (red, green, blue) pixel electrode lines 104, 103, 102. The wires 101 to 107 are disposed in parallel with each other and insulated from each other. Further, the first common electrode is a CF common electrode, and the second common electrode is a TFT common electrode.

The curing test unit 1201 is electrically connected to the wire 101 via the transmission test unit 1211, the curing test unit 1202 is electrically connected to the wire 102 via the transmission test unit 1212, and so on, and the curing test unit 1207 is electrically connected to the wire 107 via the transmission test unit 1217.

The CF substrate 12 further comprises a transparent conductive layer (not shown). The curing test units 1201 to 1207 and the transmission test units 1211 to 1217 may be formed by using a laser repair machine to laser cut the transparent conductive layer on a surface of the CF substrate 12. Preferably, the transparent conductive layer may be made of one of indium tin oxide (ITO) and indium zinc oxide (IZO).

An LCD device is further disclosed in the present disclosure. The LCD device comprises a backlight module (not shown) and an LCD panel. Referring to FIG. 1 and FIG. 2, the LCD panel comprises a TFT substrate 10 and a CF substrate 12 disposed opposite to each other, and a liquid crystal layer (not shown) sandwiched between the TFT substrate 10 and the CF substrate 12.

The TFT substrate 10 comprises a plurality of wires 101 to 107, and the CF substrate comprises a plurality of curing test units 1201 to 1207 insulated from each other.

Further, the curing test units 1201 to 1207 are electrically connected to the wires 101 to 107 respectively.

The LCD device of this embodiment has the routing structure of the LCD module described in the aforesaid embodiment.

Figure 3:
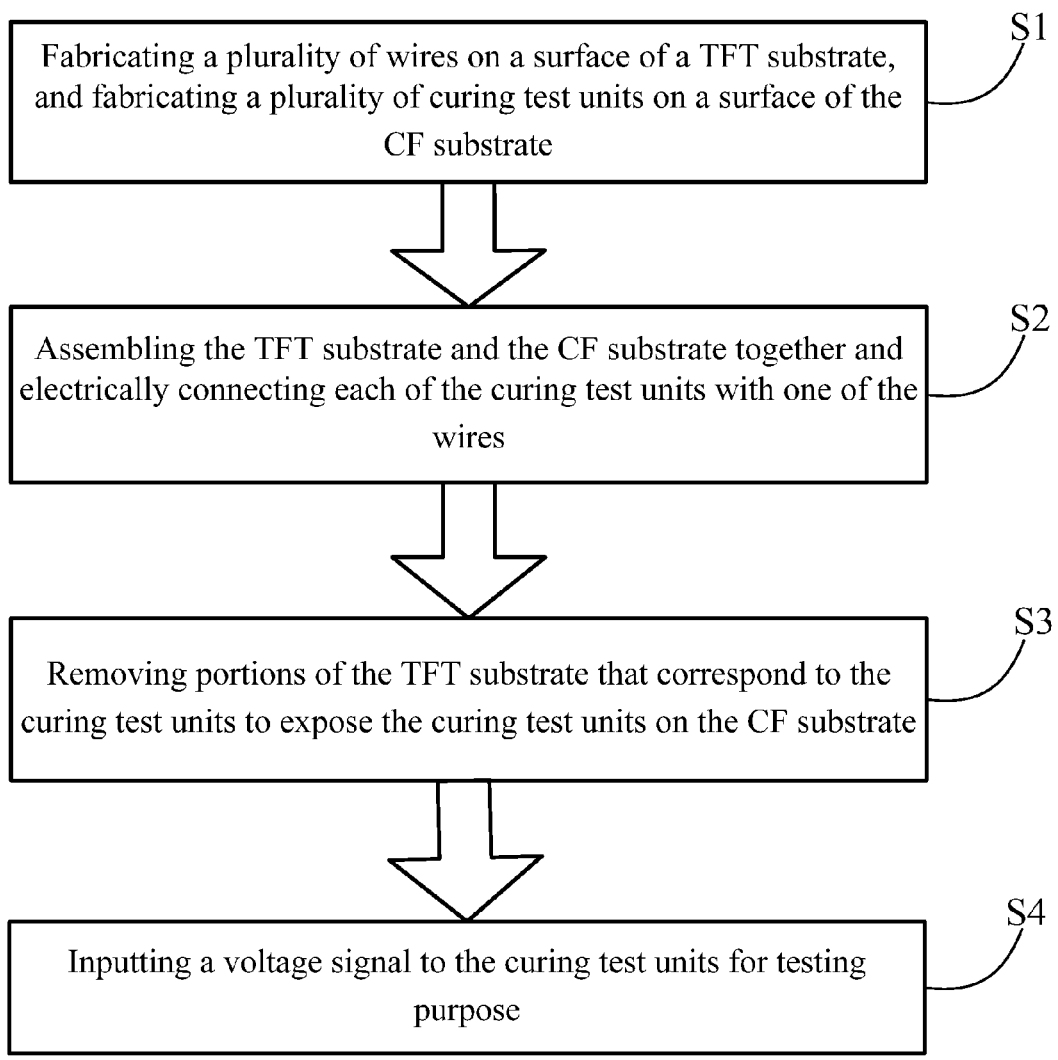
FIG. 3 is a schematic flowchart diagram of a manufacturing method of an LCD module according to a preferred embodiment of the present disclosure.

A manufacturing method of an LCD module is further disclosed in the present disclosure. Referring to FIG. 3, the manufacturing method comprises:

step S1: fabricating a plurality of wires on a surface of a TFT substrate, and fabricating a plurality of curing test units on a surface of the CF substrate;

step S2: assembling the TFT substrate and the CF substrate together and electrically connecting each of the curing test units with one of the wires; and step S3: removing portions of the TFT substrate that correspond to the curing test units to expose the curing test units on the CF substrate.

In the step S3, the removing process may be accomplished through the conventional edge cut process, and thus will not be further described herein.

Furthermore, the manufacturing method further comprises a step S4 of inputting a voltage signal to the curing test units for testing purpose after the portions of the TFT substrate that correspond to the curing test units are removed.

The present disclosure has the following benefits: as compared with the prior art, the LCD device, the LCD module and the manufacturing method thereof according to the present disclosure have the curing test units disposed on a surface of the CF substrate opposite to the TFT substrate. This can avoid occurrence of arcing in the TFT substrate during the CVD process. As a result, the product yield is improved.

According to the above descriptions, the LCD device, the LCD module and the manufacturing method thereof according to the present disclosure can avoid occurrence of arcing in the TFT substrate during the CVD process and achieve sharing of a fixture, thereby improving the product yield and reducing the manufacturing cost.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A liquid crystal display (LCD) module, comprising:
a thin film transistor (TFT) substrate and a color filter (CF) substrate disposed opposite to each other, and a liquid crystal layer sandwiched between the TFT substrate and the CF substrate, wherein:
the TFT substrate comprises a plurality of transmission test units and a plurality of wires, and the CF substrate comprises a plurality of curing test units insulated from each other; and
each of the curing test units is electrically connected to one of the wires via one of the transmission test units, and the plurality of curing test units are located at a same side of the CF substrate.

2. The LCD module of claim 1, wherein:
the CF substrate comprises a curing test component which comprises the plurality of curing test units, the TFT substrate comprises a transmission test component which comprises the plurality of transmission test units, and the curing test component and the transmission test component are located at an edge of the CF substrate and an edge of the TFT substrate that are away from each other respectively.

3. An LCD (liquid crystal display) module, comprising:
a thin film transistor (TFT) substrate and a color filter (CF) substrate disposed opposite to each other, and a liquid crystal layer sandwiched between the TFT substrate and the CF substrate, wherein:
the TFT substrate comprises a plurality of wires, and the CF substrate comprises a plurality of curing test units insulated from each other; and
each of the curing test units is electrically connected to one of the wires.

4. The LCD module of claim 3, wherein the plurality of curing test units are located at a same side of the CF substrate.

5. The LCD module of claim 4, wherein the CF substrate comprises a curing test component which comprises the plurality of curing test units.

6. The LCD module of claim 3, wherein one of the wires comprises a first common electrode, another of the wires comprises a second common electrode, and the others of the wires are routing lines.

7. The LCD module of claim 3, wherein the CF substrate comprises a transparent conductive layer, and the plurality of curing test units are formed by cutting the transparent conductive layer.

8. An LCD (liquid crystal display) device, comprising a backlight module and an LCD panel, the LCD panel comprising a thin film transistor (TFT) substrate and a color filter (CF) substrate disposed opposite to each other, and a liquid crystal layer sandwiched between the TFT substrate and the CF substrate, wherein:
the TFT substrate comprises a plurality of wires, and the CF substrate comprises a plurality of curing test units insulated from each other; and
each of the curing test units is electrically connected to one of the wires.

9. A manufacturing method of an LCD (liquid crystal display) module, comprising:
fabricating a plurality of wires on a surface of a thin film transistor (TFT) substrate, and fabricating a plurality of curing test units on a surface of a color filter (CF) substrate;
assembling the TFT substrate and the CF substrate together and electrically connecting each of the curing test units with one of the wires; and
removing portions of the TFT substrate that correspond to the curing test units to expose the curing test units on the CF substrate.

10. The manufacturing method of claim 9, wherein a voltage signal is inputted to the curing test units for testing purpose after the portions of the TFT substrate that correspond to the curing test units are removed.

* * * * *